United States Patent
Lee

(10) Patent No.: US 11,953,703 B2
(45) Date of Patent: Apr. 9, 2024

(54) LENS MODULE AND CAMERA MODULE INCLUDING THE SAME

(71) Applicant: LG INNOTEK CO., LTD., Seoul (KR)

(72) Inventor: Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 904 days.

(21) Appl. No.: 16/971,240

(22) PCT Filed: Feb. 22, 2019

(86) PCT No.: PCT/KR2019/002211
§ 371 (c)(1),
(2) Date: Aug. 19, 2020

(87) PCT Pub. No.: WO2019/164335
PCT Pub. Date: Aug. 29, 2019

(65) Prior Publication Data
US 2021/0080621 A1 Mar. 18, 2021

(30) Foreign Application Priority Data
Feb. 23, 2018 (KR) .......... 10-2018-0022120

(51) Int. Cl.
*G02B 7/09* (2021.01)
*G02B 3/14* (2006.01)
(Continued)

(52) U.S. Cl.
CPC .............. *G02B 3/14* (2013.01); *G02B 7/09* (2013.01); *G02B 26/004* (2013.01);
(Continued)

(58) Field of Classification Search
CPC ... G02B 3/14; G02B 7/09; G02B 7/08; G02B 26/004; G02B 27/646; G03B 3/10;
(Continued)

(56) References Cited

U.S. PATENT DOCUMENTS

2016/0259094 A1 9/2016 Aschwanden et al.
2019/0104239 A1\* 4/2019 Aschwanden .......... G02B 3/14

FOREIGN PATENT DOCUMENTS

CN 105324711 A 2/2016
CN 105717725 A 6/2016
(Continued)

OTHER PUBLICATIONS

Office Action dated Jul. 11, 2022 in Chinese Application No. 201980015040.4.
(Continued)

*Primary Examiner* — Derek S. Chapel
(74) *Attorney, Agent, or Firm* — Saliwanchik, Lloyd & Eisenschenk

(57) ABSTRACT

A lens module includes a lens having therein a cavity to accommodate a fluid; a first mover frame supporting the lens, the first mover frame comprising a pressurizing portion disposed to face a pressurized region of the fluid; a magnet disposed at the first mover frame; a coil unit comprising coils disposed to face the magnet in a first direction perpendicular to an optical axis; a second mover frame disposed to face the first mover frame in a second direction parallel to the optical axis, with the magnet interposed therebetween, the second mover frame supporting the magnet together with the first mover frame; and a driving controller configured to control supply of current to the coils such that the pressurized region of the lens is pressurized by the pressurizing portion of the first mover frame through interaction between the coils and the magnet.

18 Claims, 15 Drawing Sheets

(51) Int. Cl.
  *G02B 26/00* (2006.01)
  *G02B 27/64* (2006.01)
  *G03B 3/10* (2021.01)
  *G03B 5/00* (2021.01)
  *G03B 13/36* (2021.01)
  *G03B 30/00* (2021.01)
  *H04N 23/55* (2023.01)
  *H04N 23/57* (2023.01)

(52) U.S. Cl.
  CPC ............ *G02B 27/646* (2013.01); *G03B 3/10* (2013.01); *G03B 5/00* (2013.01); *G03B 13/36* (2013.01); *G03B 30/00* (2021.01); *H04N 23/55* (2023.01); *H04N 23/57* (2023.01); *G03B 2205/0007* (2013.01)

(58) Field of Classification Search
  CPC . G03B 3/00; G03B 5/00; G03B 13/36; G03B 30/00; G03B 2205/0007; G03B 2205/0046; G03B 2205/0069; H04N 23/55; H04N 23/57; H04N 23/00
  See application file for complete search history.

(56) References Cited

FOREIGN PATENT DOCUMENTS

| | | |
|---|---|---|
| CN | 205427287 U | 8/2016 |
| CN | 106772902 A | 5/2017 |
| JP | 2006-47356 A | 2/2006 |
| JP | 2011-112757 A | 6/2011 |
| KR | 10-2012-0077657 A | 7/2012 |
| KR | 10-2013-0036626 A | 4/2013 |
| KR | 10-1356790 B1 | 1/2014 |
| KR | 10-2016-0068992 A | 6/2016 |
| WO | 2017-160094 A1 | 9/2017 |
| WO | WO-2017/149092 A2 | 9/2017 |

OTHER PUBLICATIONS

International Search Report in International Application No. PCT/KR2019/002211, filed Feb. 22, 2019.

Office Action dated Jan. 10, 2022 in Chinese Application No. 201980015040.4.

* cited by examiner

LENS MODULE AND CAMERA MODULE
INCLUDING THE SAME

CROSS-REFERENCE TO RELATED APPLICATIONS

This application is the U.S. national stage application of International Patent Application No. PCT/KR2019/002211, filed Feb. 22, 2019, which claims the benefit under 35 U.S.C. § 119 of Korean Application No. 10-2018-0022120, filed Feb. 23, 2018, the disclosures of each of which are incorporated herein by reference in their entirety.

TECHNICAL FIELD

Embodiments relate to a lens module and a camera module including the same.

BACKGROUND ART

People who use portable devices demand optical devices that have high resolution, are small, and have various photographing functions. For example, these various photographing functions may be at least one of an optical zoom-in/zoom-out function, an auto-focusing (AF) function, or a hand-tremor compensation or optical image stabilization (OIS) function.

In a conventional art, in order to implement the various photographing functions described above, a method of combining a plurality of lenses and directly moving the combined lenses is used. In the case in which the number of lenses is increased, however, the size of an optical device may increase.

The auto-focusing and hand-tremor compensation functions are performed by moving or tilting a plurality of lenses, which are secured to a lens holder and are aligned along an optical axis, in an optical-axis direction or a direction perpendicular to the optical axis. To this end, a separate lens module is required to move a lens assembly composed of a plurality of lenses. However, the lens module has high power consumption, and an additional cover glass needs to be provided separately from a camera module in order to protect the lens module, thus causing a problem in that the overall size of the conventional camera module increases. In order to solve this, studies have been conducted on a liquid lens that performs auto-focusing and hand-tremor compensation functions by electrically adjusting the curvature of a liquid.

DISCLOSURE

Technical Problem

Embodiments provide a lens module that has a simple configuration and enables more accurate adjustment of the focus of a lens, and a camera module including the same.

The objects to be accomplished by the disclosure are not limited to the above-mentioned objects, and other objects not mentioned herein will be clearly understood by those skilled in the art from the following description.

Technical Solution

A lens module according to an embodiment may include a lens having therein a cavity to accommodate a fluid, a first mover frame supporting the lens and including a pressurizing portion disposed to face a pressurized region of the fluid, a magnet disposed at the first mover frame, a coil unit including coils disposed to face the magnet in a first direction perpendicular to an optical axis, a second mover frame disposed to face the first mover frame in a second direction parallel to the optical axis, with the magnet interposed therebetween, the second mover frame supporting the magnet together with the first mover frame, and a driving controller configured to control supply of current to the coils such that the pressurized region of the lens is pressurized by the pressurizing portion of the first mover frame through interaction between the coils and the magnet.

For example, the lens may include a fluid, a receiving body accommodating the fluid, a movable membrane disposed to store the fluid together with the receiving body, and a pressurizing frame disposed between the movable membrane and the first mover frame to apply the driving force from the first mover frame to the pressurized region.

For example, the pressurizing frame may include a driving frame disposed under the movable membrane and having therein a hollow portion, and a protrusion protruding outwards from a lower portion of the driving frame and disposed between the pressurizing portion of the first mover frame and the pressurized region in the second direction.

For example, the lens module may further include an upper elastic member disposed between the movable membrane and the pressurizing frame.

For example, the lens module may further include a spacer disposed between the lens and the first mover frame.

For example, the coil unit may include a coil holder holding the coils, and a coil terminal disposed on the coil holder to form a path through which current is supplied to the coils.

For example, the lens module may further include a base disposed under the second mover frame.

For example, the lens module may further include a lower elastic member disposed between the second mover frame and the base.

For example, the driving controller may include first and second printed circuit boards configured to supply current to the coils and disposed opposite each other.

For example, the driving controller may further include a first detection sensor disposed on the inner surface of the first printed circuit board and a second detection sensor disposed on the inner surface of the second printed circuit board.

For example, the first printed circuit board may include a first terminal unit electrically connected to the first detection sensor and to a first coil among the coils, and the second printed circuit board may include a second terminal unit electrically connected to the second detection sensor and to a second coil among the coils.

For example, the lens module may further include a cover disposed so as to surround the first mover frame, the magnet, the coil unit, and the second mover frame together with the first and second printed circuit boards.

A lens module according to another embodiment may include a main board, an image sensor disposed on the main board, and at least one lens unit disposed so as to be aligned with the image sensor in an optical-axis direction, and the at least one lens unit may include the lens module.

Advantageous Effects

In a lens module and a camera module according to embodiments, since a structure for applying driving force to a fluid in a lens is simplified compared to a voice-coil-motor type, the configuration thereof may be less complicated, the manufacturing costs thereof may be reduced, the manufacturing process thereof may be simplified, and the overall size thereof may be reduced.

However, the effects achievable through the disclosure are not limited to the above-mentioned effects, and other effects not mentioned herein will be clearly understood by those skilled in the art from the following description.

BEST MODE

Figure 1:
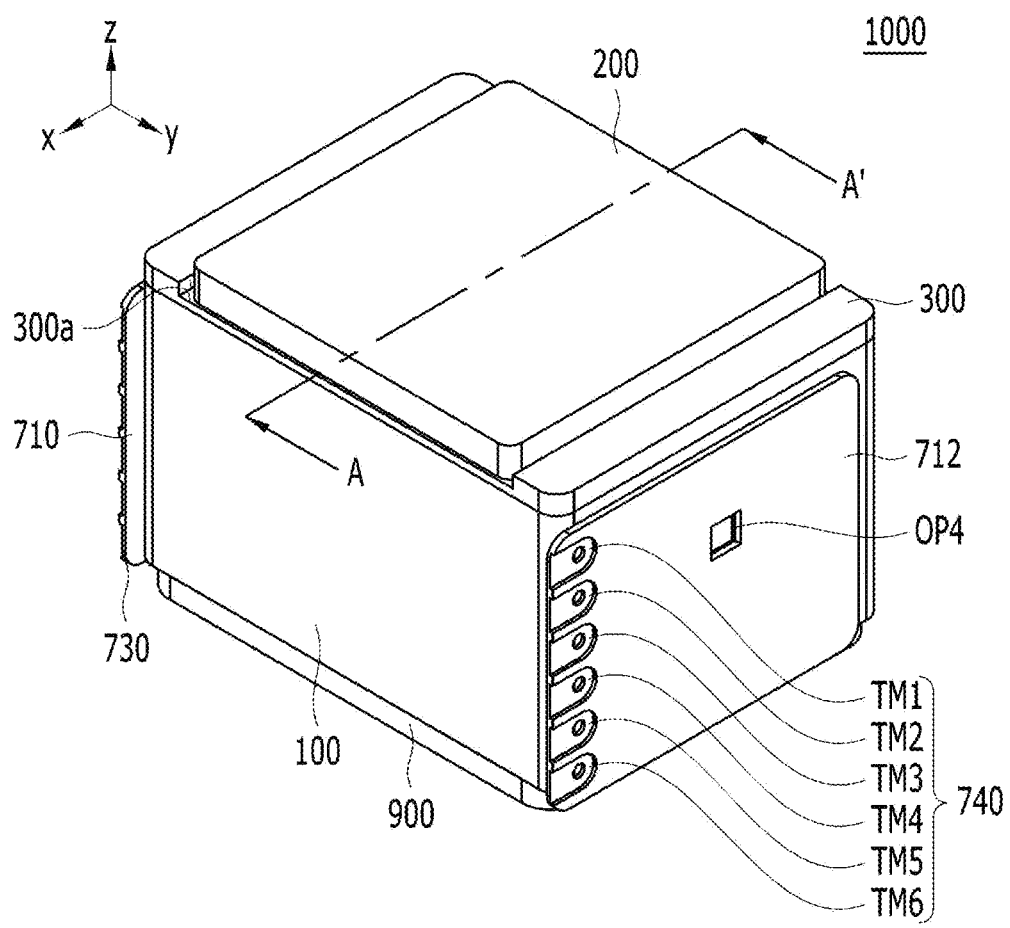
FIG. 1 illustrates a schematic perspective view of a lens module according to an embodiment.

Hereinafter, exemplary embodiments will be described in detail with reference to the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meanings as those commonly understood by one of ordinary skill in the art to which the disclosure pertains. It will be further understood that terms such as those defined in commonly used dictionaries should be interpreted as having meanings consistent with their meanings in the context of the relevant art, and are not to be interpreted in an idealized or overly formal sense unless expressly so defined herein.

Hereinafter, a lens module 1000 and a camera module 2000 according to embodiments will be described with reference to the accompanying drawings. For convenience of description, the lens module 1000 and the camera module 2000 according to the embodiments will be described using the Cartesian coordinate system (x, y, z), but the embodiments are not limited thereto. The embodiments may also be described using any other coordinate system. In the Cartesian coordinate system, the x-axis, the y-axis and the z-axis are perpendicular to one another, but the embodiments are not limited thereto. That is, the x-axis, the y-axis, and the z-axis may intersect one another obliquely, rather than being perpendicular to one another.

Figure 2:
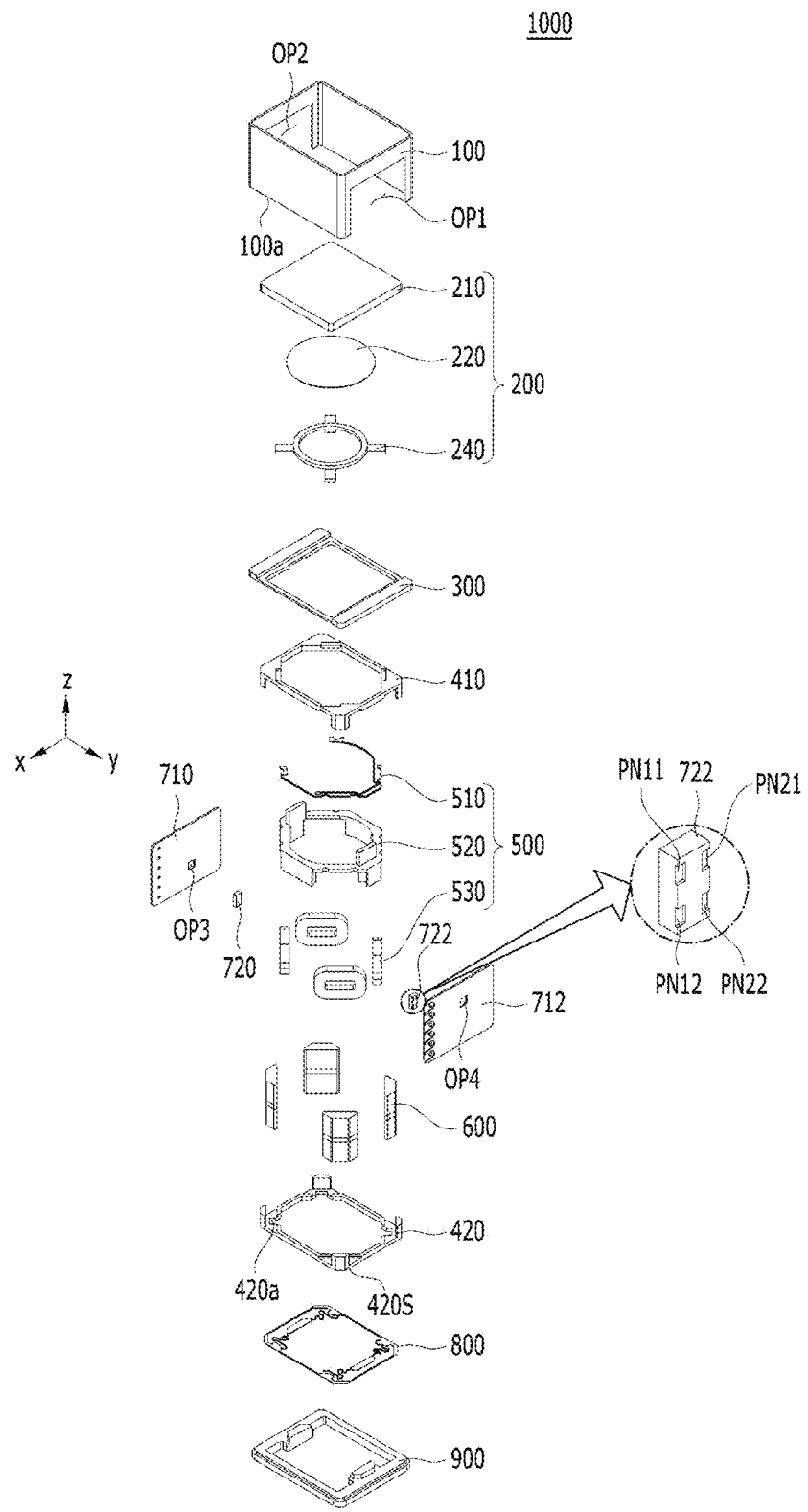
FIG. 2 illustrates an exploded perspective view of the lens module illustrated in FIG. 1.
Figure 3:
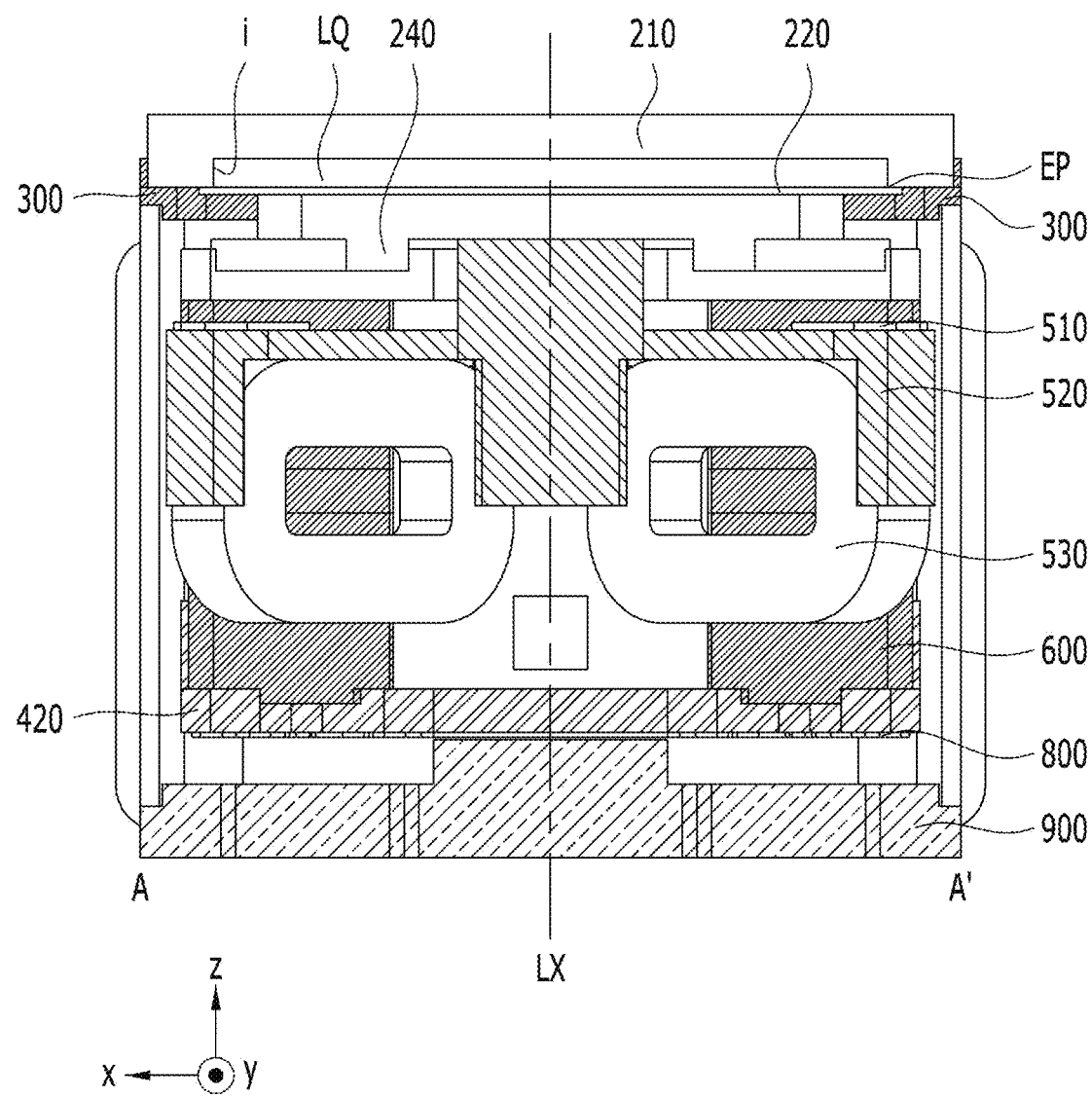
FIG. 3 illustrates a cross-sectional view of the lens module taken along line A-A' in FIG. 1.

FIG. 1 illustrates a schematic perspective view of a lens module 1000 according to an embodiment, FIG. 2 illustrates an exploded perspective view of the lens module 1000 illustrated in FIG. 1, and FIG. 3 illustrates a cross-sectional view of the lens module 1000 taken along line A-A' in FIG. 1.

Referring to FIGS. 1 and 2, the lens module 1000 according to the embodiment may include a lens 200 and a lens-driving device.

Figure 4A:
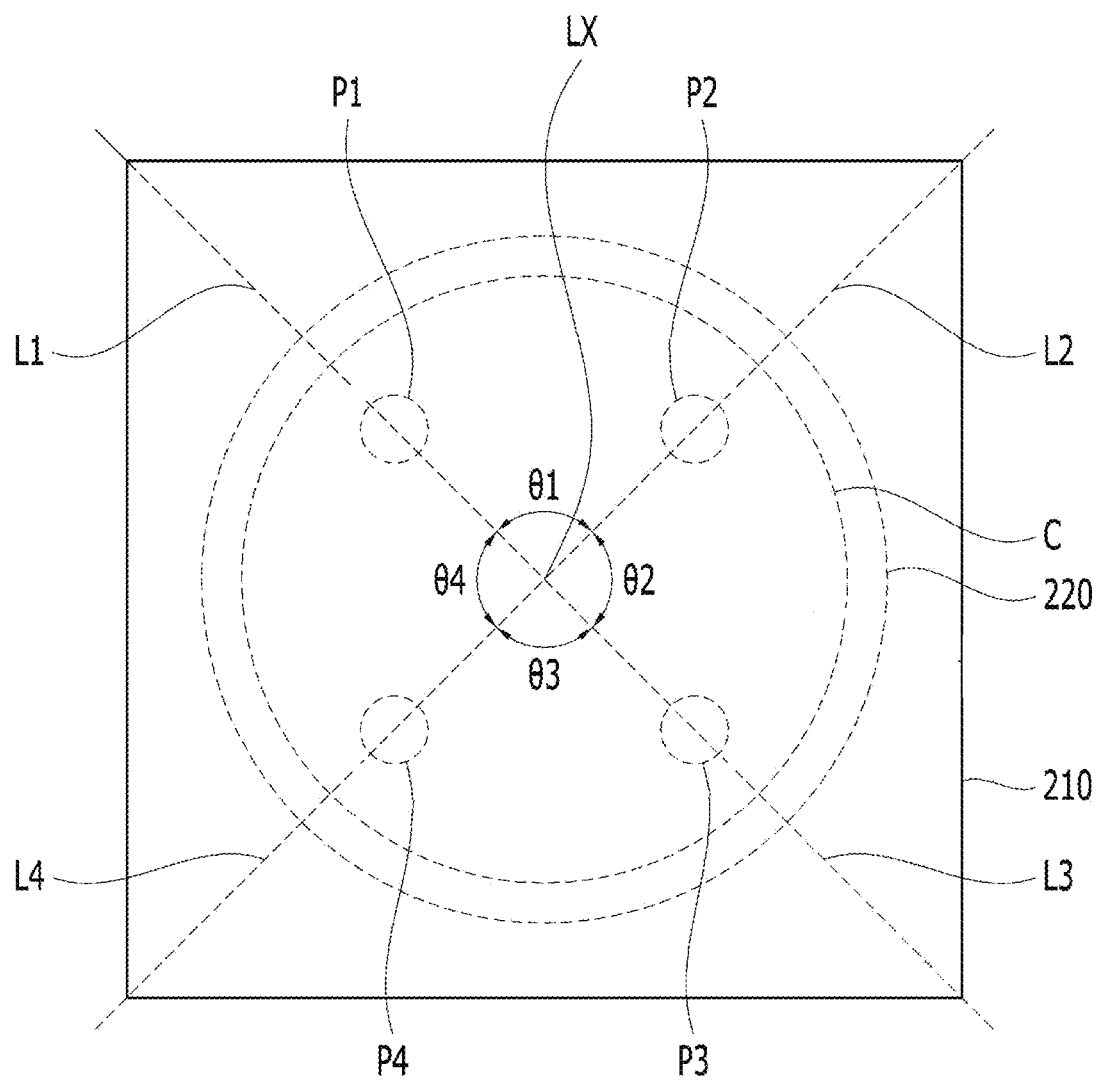
FIGS. 4a and 4b respectively illustrate a plan view and a cross-sectional view of the lens shown in FIG. 2.
Figure 4B:
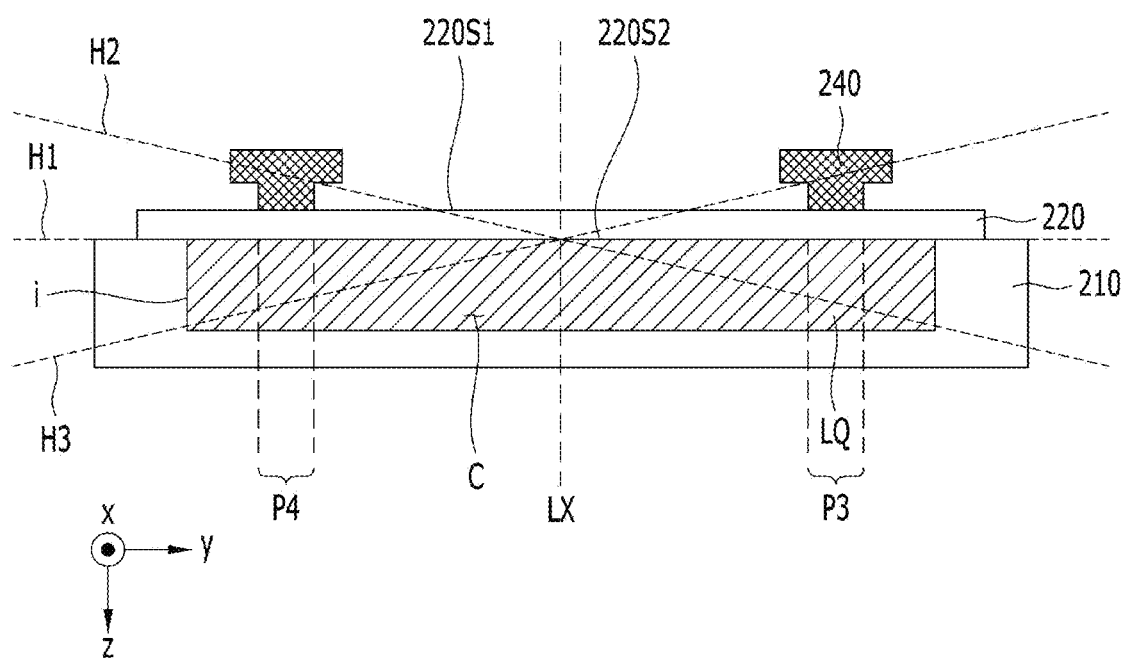

FIGS. 4a and 4b respectively illustrate a plan view and a cross-sectional view of the lens 200 shown in FIG. 2.

Referring to FIGS. 2 to 4b, according to the embodiment, the lens 200 may include a fluid LQ, a receiving body 210, a movable membrane 220, and a pressurizing frame 240.

The fluid (or liquid) LQ may be transparent, non-volatile, and chemically stable. In addition, the fluid LQ may have excellent mobility due to the low viscosity thereof. The viscosity of the fluid LQ may have an influence on the flow rate of the fluid LQ. If the flow rate is low, the fluid LQ may have a low speed of reaction to the driving force applied from the lens-driving device, and it may be difficult to precisely control the flow of the fluid LQ. Specifically, when a driving force is applied to the fluid LQ, if the viscosity of the fluid LQ is relatively high, the time taken for the fluid LQ to deform a lens surface 220S1 or 220S2 of the movable membrane 220, i.e. the response time, may be increased. Here, the lens surface may be the bottom surface 220S1 of the movable membrane 220 or the top surface 220S2 thereof. Hereinafter, the lens surface will be denoted by 220S for convenience of description. When the viscosity of the fluid LQ is high, there may occur an overshooting phenomenon in which the fluid LQ is deformed more than deformation attributable to the actual pressure applied thereto.

For example, the fluid LQ may be silicon oil or silicon fluid. In addition, the fluid LQ may include transparent hydrocarbon-based oil, ester oil, ether-based oil, or perfluoropolyether oil. However, the embodiment is not limited as to the type of the fluid LQ.

The receiving body 210 serves to receive the fluid LQ. Since the receiving body 210 is located in a path through which light travels, it may be made of a light-transmissive material. The receiving body 210 includes a cavity C formed therein to receive the fluid LQ. As shown in FIG. 4a, the cavity C may have a circular-shaped bottom surface. However, the embodiment is not limited thereto. According to another embodiment, the cavity C may have an elliptical-shaped or polygonal-shaped bottom surface. As such, so long as the fluid LQ is capable of being received in the cavity C in the receiving body 210, the embodiment is not limited to any specific shape of the bottom surface of the cavity C or to any specific cross-sectional shape of the cavity C.

The movable membrane 220 serves to store the fluid LQ in the cavity C together with the receiving body 210. The top surface 220S2 of the movable membrane 220 may be in contact with the bottom surface of the fluid LQ. Since the movable membrane 220 is disposed in a path through which light travels, it may be light-transmissive. As shown in FIG. 4a, the movable membrane 220 may have a circular-shaped bottom surface. However, the embodiment is not limited thereto. According to another embodiment, the movable membrane 220 may have an elliptical-shaped or polygonal-shaped bottom surface. As such, so long as the movable membrane 220 is capable of storing the fluid LQ together with the receiving body 210, the embodiment is not limited to any specific shape of the bottom surface of the movable membrane 220 or to any specific cross-sectional shape of the movable membrane 220.

The pressurizing frame 240 may be disposed between the movable membrane 220 and a first mover frame 410 to be described later. The pressurizing frame 240 serves to transmit the driving force applied from the first mover frame 410 to a pressurized region.

When the driving force is not applied to the fluid LQ and thus no pressure is applied to the fluid, the lens surface 220S of the movable membrane 220 is positioned in a horizontal plane H1. However, when the driving force is applied to the fluid LQ and thus pressure is applied to the pressurized region of the fluid LQ, the fluid LQ may flow, whereby the lens surface 220S of the movable membrane 220 may be tilted to any one side. This is because the pressure from the fluid LQ is applied to the lens surface 220S of the movable membrane 220. The pressure from the fluid LQ may change the shape of the lens surface 220S of the movable membrane 220, i.e. the curvature of the lens surface 220S, or may tilt the lens surface 220S, thereby adjusting the focal length of the lens 200.

The pressurized region of the fluid LQ may be located at the edge of the fluid LQ. As illustrated in FIG. 4a, the pressurized region may include first to fourth pressurized regions P1 to P4. The first to fourth pressurized regions P1 to P4 may be spaced apart from each other at regular intervals with respect to an optical axis LX, or may be spaced apart from each other at different intervals.

Referring to FIG. 4a, at least one of the angle (hereinafter referred to as the 'first angle θ1') between a first line segment L1 connecting the optical axis LX and any one point (e.g. center) of the first pressurized region P1 and a second line segment L2 connecting the optical axis LX and any one point (e.g. center) of the second pressurized region P2, the angle (hereinafter referred to as the 'second angle θ2') between a third line segment L3 connecting the optical axis LX and any one point (e.g. center) of the third pressurized region P3 and the second line segment L2, the angle (hereinafter referred to as the 'third angle θ3') between a fourth line segment L4 connecting the optical axis LX and any one point (e.g. center) of the fourth pressurized region P4 and the third line segment L3, or the angle (hereinafter referred to as the 'fourth angle θ4') between the fourth line segment L4 and the first line segment L1 may be different from the other angles. Alternatively, the first to fourth angles θ1 to θ4 may be the same, and may each be 90°.

For example, referring to FIG. 4b, when the driving force is applied to the third pressurized region P3, the lens surface 220S of the movable membrane 220 may be tilted from the state of being positioned in the horizontal plane H1 so as to be positioned in a first tilted plane H2, and when the driving force is applied to the fourth pressurized region P4, the lens surface 220S of the movable membrane 220 may be tilted from the state of being positioned in the horizontal plane H1 so as to be positioned in a second tilted plane H3. As such, the lens surface 220S of the movable membrane 220 is capable of being tilted so as to be positioned in the first or second tilted plane H2 or H3, thereby enabling the OIS function. The OIS function, which is performed in small-scale camera modules of mobile devices such as smart phones or tablet PCs, may mean a function that is performed in order to inhibit the contour of an image captured when taking a still image from being blurred due to vibrations caused by the tremor of the user's hand.

Since the movable membrane 220 is located in a path through which light travels, it may include an elastic material.

The driving force applied to the pressurizing frame 240 from the first mover frame 410 may be transmitted to the pressurized region of the fluid LQ through the movable membrane 220. If the movable membrane 220 is elastic, after the driving force is applied to the fluid LQ and the lens surface 220S is tilted, the tilted lens surface 220S may be restored to the original state of being positioned in the horizontal plane H1, by the movable membrane 220, which is elastic. To this end, the movable membrane 220 may be a transparent elastic optical membrane. Specifically, the movable membrane 220 may be highly elastic and chemically stable. For example, the movable membrane 220 may include polydimethyl siloxane (PDMS) elastomer, polymethylphenyl siloxane (PMPS) elastomer, fluorosilicone elastomer, polyether elastomer, propylene oxide elastomer, polyester elastomer, or the like.

However, if the movable membrane 220 is not at all elastic or if the movable membrane 220 is insufficiently elastic to restore the tilted lens surface 220S to the original state of being positioned in the horizontal plane H1, the lens 200 may further include an upper elastic member (not shown). The upper elastic member may be disposed between the movable membrane 220 and the pressurizing frame 240. In this case, after the lens surface 220S is tilted so as to be positioned in the first or second tilted plane H2 or H3, the tilted lens surface 220S may be restored to the state of being positioned in the horizontal plane H1 by the upper elastic member.

In order to store the fluid LQ together with the receiving body 210, the planar area (or diameter) of the movable membrane 220 needs to be larger than the planar area (or diameter) of the cavity C. Therefore, the driving force transmitted from the pressurizing frame 240 to the movable membrane 220 is applied not only to the fluid LQ, but also to the receiving body 210, and is thus distributed, whereby the driving force applied to the fluid LQ may be reduced. Considering this, it is required to increase the driving force.

The lens-driving device serves to apply the driving force to the lens 200 described above. To this end, the lens-driving device may include a first mover frame 410, a second mover frame 420, a coil unit 500, a magnet 600, and a driving controller. In addition, the lens-driving device according to the embodiment may further include at least one of a cover 100, a spacer 300, a lower elastic member 800, or a base 900.

Figure 5:
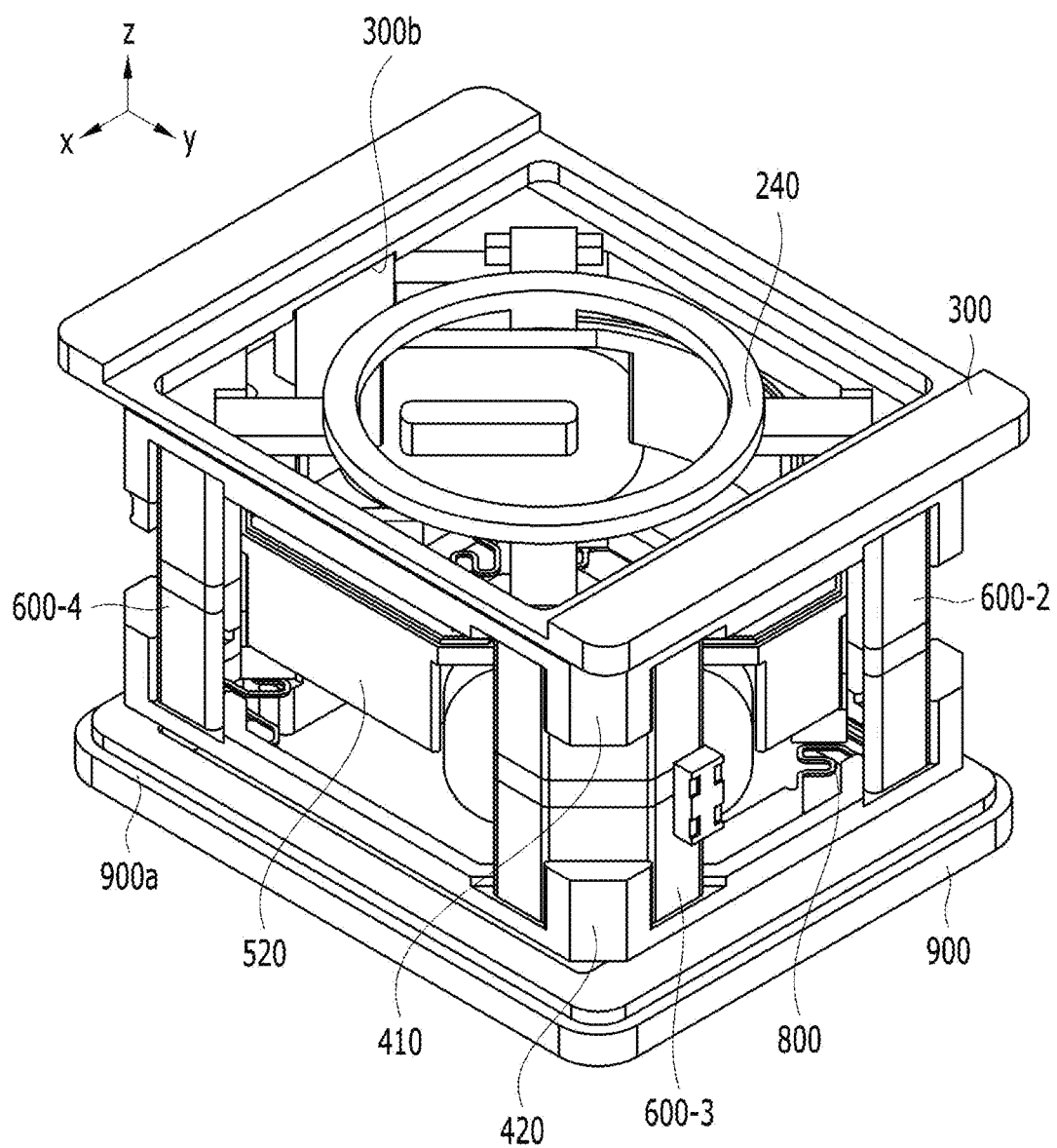
FIG. 5 illustrates a perspective view of the lens module shown in FIGS. 1 and 2, from which a cover, a receiving body, a movable membrane, and a driving controller are removed.
Figure 6:
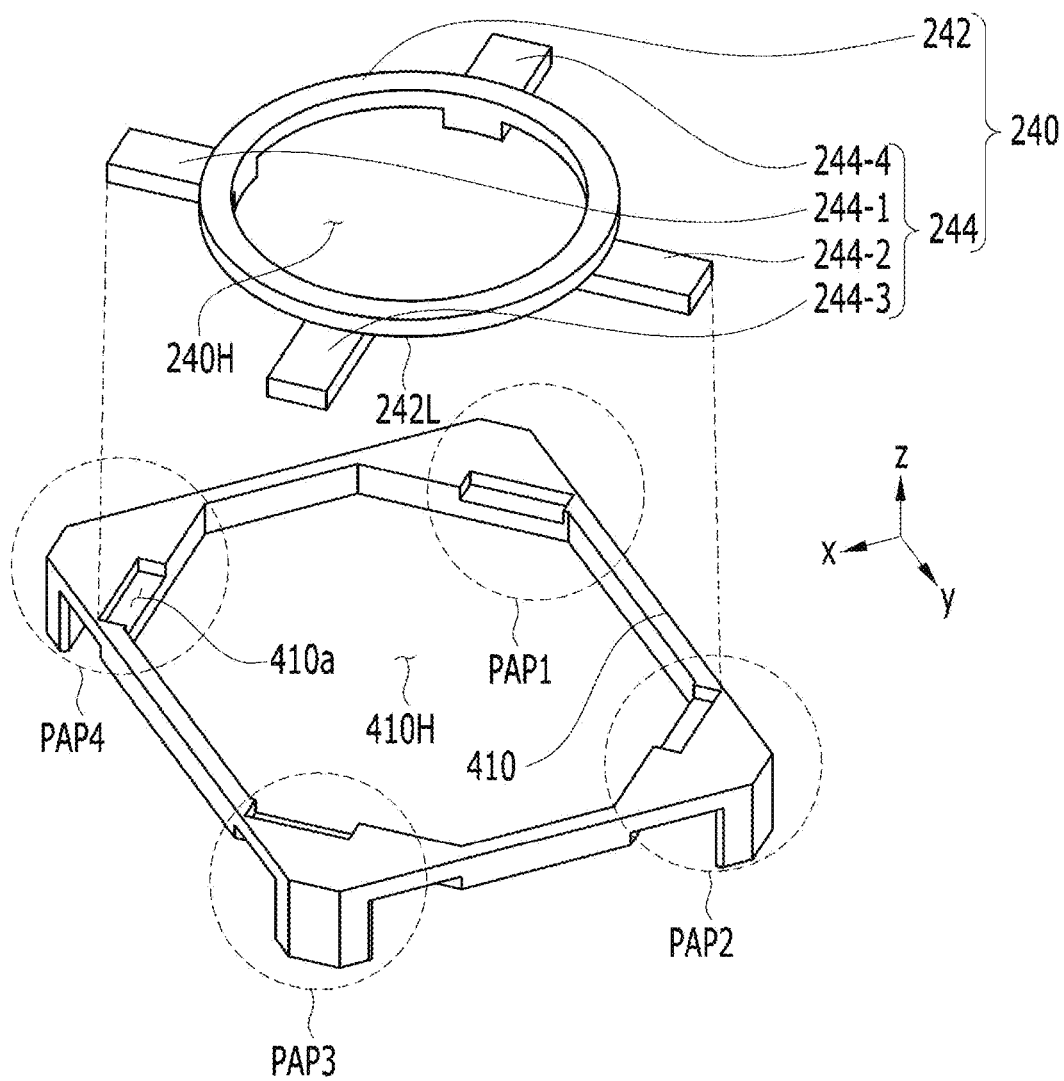
FIG. 6 illustrates an exploded perspective view of a pressurizing frame and a first mover frame.

FIG. 5 illustrates a perspective view of the lens module 1000 shown in FIGS. 1 and 2, from which the cover 100, the receiving body 210, the movable membrane 220, and the driving controller (e.g. 710, 712, 720 and 722) are removed, and FIG. 6 illustrates an exploded perspective view of the pressurizing frame 240 and the first mover frame 410.

The first mover frame 410 serves to apply the driving force to the pressurized regions (e.g. P1 to P4) of the fluid LQ. To this end, the first mover frame 410 may include a pressurizing portion PAP. The pressurizing portion PAP may be disposed to face the pressurized region of the fluid LQ in a direction parallel to the optical axis LX (e.g. in the z-axis direction). For example, when the pressurized region includes the first to fourth pressurized regions P1 to P4, the pressurizing portion PAP of the first mover frame 410 may include first to fourth pressurizing portions PAP1 to PAP4, which respectively face the first to fourth pressurized regions P1 to P4.

Referring to FIGS. 5 and 6, the pressurizing frame 240 may include a driving frame 242 and a protrusion 244. The driving frame 242 may be disposed under the movable membrane 220, and may have a hollow portion 240H formed therein. The first mover frame 410 may include therein a hollow portion 410H. Due to the hollow portions 410H and 240H formed in the first mover frame 410 and the driving frame 242, a path through which light incident on the lens 200 travels may be formed.

The driving frame 242 may be disposed between the movable membrane 220 and the first mover frame 410, and may apply the driving force from the first mover frame 410 to the movable membrane 220. The driving frame 242 may be in contact with the movable membrane 220, and thus may directly apply the driving force from the first mover frame 410 to the movable membrane 220. Alternatively, a separate member may be disposed between the driving frame 242 and the movable membrane 220, and thus the driving force from the first mover frame 410 may be indirectly applied to the movable membrane 220 via the separate member. The protrusion 244 may be disposed under the driving frame 242, and may have a shape that protrudes outwards. For example, as shown in FIG. 6, the protrusion 244 may protrude outwards from the bottom surface 242L of the driving frame 242, and may be integrally formed with the driving frame 242 or provided separately from the driving frame 242. The protrusion 244 may be disposed to face the pressurizing portion PAP of the first mover frame 410.

For example, when the pressurized region includes the first to fourth pressurized regions P1 to P4, the protrusion 244 may include first to fourth protrusions 244-1 to 244-4. At least a portion of each of the first to fourth protrusions 244-1 to 244-4 may face a respective one of the first to fourth pressurized regions P1 to P4 in a direction parallel to the optical axis LX (e.g. in the z-axis direction).

Accordingly, each of the first to fourth protrusions 244-1 to 244-4 may be disposed between a respective one of the first to fourth pressurizing portions PAP1 to PAP4 of the first mover frame 410 and the first to fourth pressurized regions P1 to P4 of the fluid LQ in a direction parallel to the optical axis LX (e.g. in the z-axis direction). The first to fourth protrusions 244-1 to 244-4 are parts that receive the driving force applied from the first to fourth pressurizing portions PAP1 to PAP4 of the first mover frame 410, and may not actually protrude, depending on the shape of the first to fourth pressurizing portions PAP1 to PAP4. That is, in order to receive the driving force applied from the first to fourth pressurizing portions PAP1 to PAP4, the pressurizing frame 240 may have various shapes, different from that of the first to fourth protrusions 244-1 to 244-4.

In addition, the first mover frame 410 may also serve to support the lens 200. To this end, the first mover frame 410 may include therein a receiving hole 410a. Hereinafter, the receiving hole may mean a through-hole, or may mean a blind hole (or a recess).

The protrusion 244 of the pressurizing frame 240 of the lens 200 may be seated in and supported by the receiving hole 410a. Therefore, the shape and number of receiving holes 410a may vary depending on the shape and number of protrusions 244.

When the shape and number of protrusions 244 are set as shown in FIG. 6, the receiving hole 410a may include first to fourth receiving holes 410a, each of which receives a respective one of the first to fourth protrusions 244-1 to 244-4. The receiving holes 410a may be formed in the inner sides of the pressurizing portions PAP1 to PAP4 in the top surface of the first mover frame 410.

Referring again to FIGS. 1 to 3 and 5, the spacer 300 may be disposed between the lens 200 and the first mover frame 410. Referring to FIG. 3, the fluid LQ flows when the driving force is applied thereto. Among the engaged portions between the movable membrane 220 and the receiving body 210, the portion having the smallest engagement force may be damaged by the flow of the fluid LQ, and the fluid LQ may leak to the outside. For example, when the fluid LQ receives the driving force and flows, the fluid LQ may leak through a point EP at which the inclined surface i of the cavity C meet the movable membrane 220. In order to inhibit this, the spacer 300 may be disposed under the portion (e.g. "EP") that has the smallest engagement force between the movable membrane 220 and the receiving body 210. In some cases, the spacer 300 may be omitted.

In addition, the spacer 300 may include therein a receiving hole 300a, in which the receiving body 210 of the lens 200 is received. The receiving hole 300a may be formed in the upper side of the spacer 300.

Figure 7:
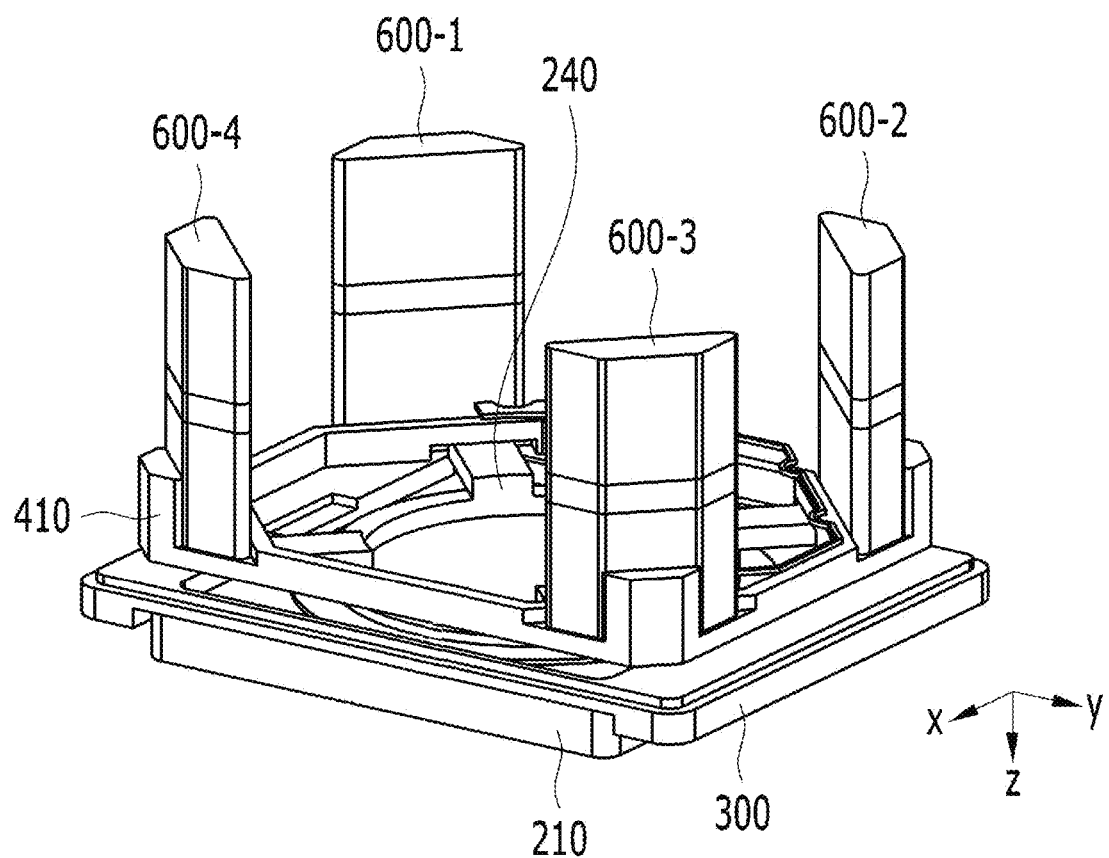
FIG. 7 illustrates a bottom assembled perspective view of a lens, a spacer, a first mover frame, a coil unit, and a magnet.
Figure 8:
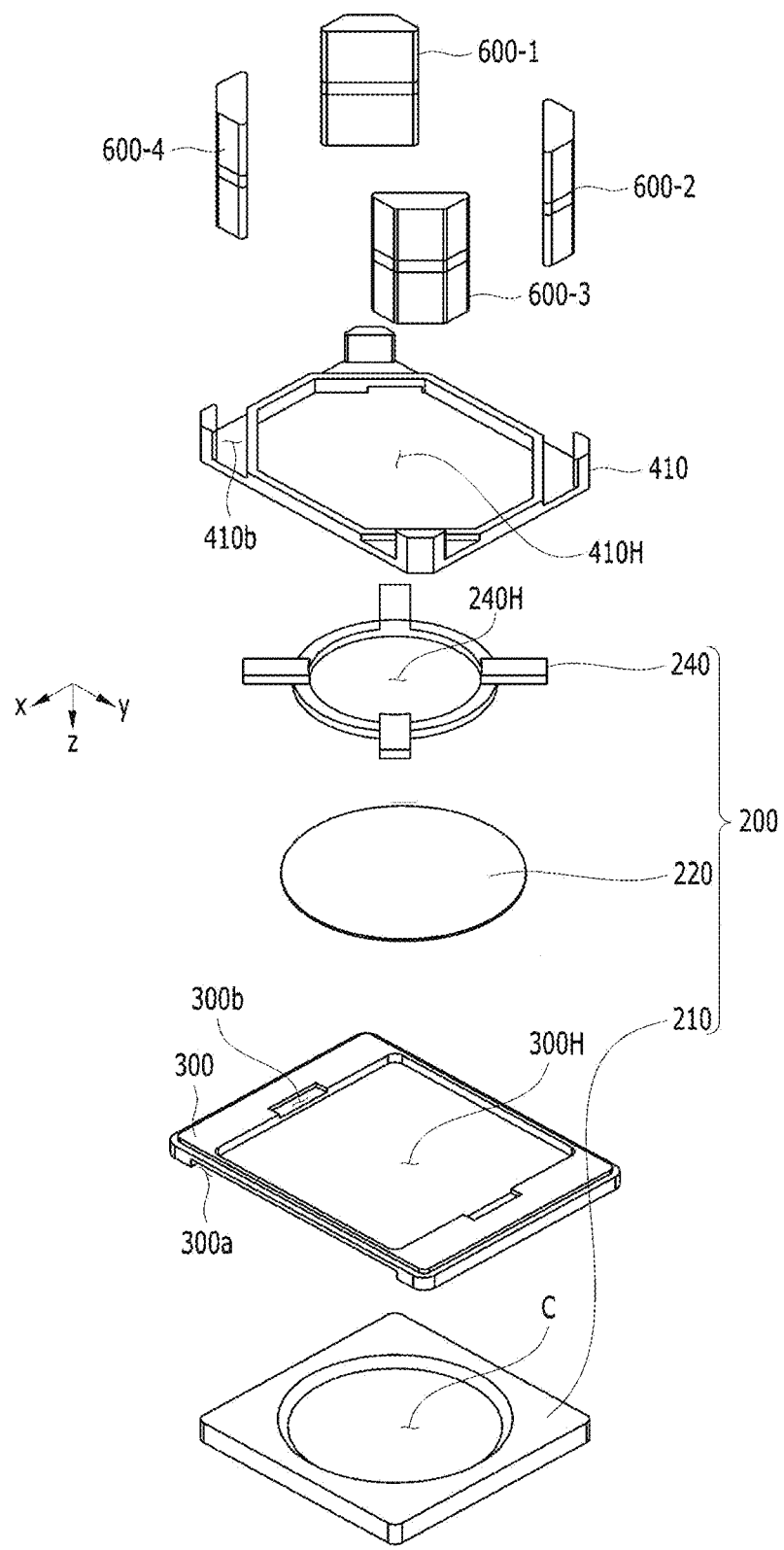
FIG. 8 illustrates a bottom exploded perspective view of the lens, the spacer, the first mover frame, the coil unit, and the magnet.

FIG. 7 illustrates a bottom assembled perspective view of the lens 200, the spacer 300, the first mover frame 410, the coil unit 500, and the magnet 600, and FIG. 8 illustrates a bottom exploded perspective view of the lens 200, the spacer 300, the first mover frame 410, the coil unit 500, and the magnet 600.

Similar to the pressurizing frame 240 and the first mover frame 410, the spacer 300 may also include therein a hollow portion 300H. The hollow portion 300H may form a path through which light travels together with the hollow portions 240H and 410H.

The magnet 600 may be disposed under the first mover frame 410 so as to face the pressurizing portion PAP.

At least two magnets 600 may be installed. According to the embodiment, as illustrated, four magnets 600-1 to 600-4 may be installed. As illustrated, among the first to fourth magnets 600-1 to 600-4, a pair of magnets 600-1 and 600-3 may be disposed opposite each other in a first diagonal direction, and the remaining pair of magnets 600-2 and 600-4 may be disposed opposite each other in a second diagonal direction.

The number of magnets 600 may be the same as the number of pressurizing portions PAP. As illustrated, the magnets 600 may include the first to fourth magnets 600-1 to 600-4, each of which is disposed to face a respective one of the first to fourth pressurizing portions PAP1 to PAP4 of the first mover frame 410 in a direction parallel to the optical axis LX.

In addition, the first mover frame 410 may further include therein receiving holes 410b, in which the upper portions of the first to fourth magnets 600-1 to 600-4 are seated. The receiving holes 410b may be formed in the first mover frame 410 so as to be positioned under the pressurizing portions PAP1 to PAP4, and may have a shape that allows the upper portions of the magnets 600 to be inserted thereinto.

According to the embodiment, the magnets 600 may be disposed at the corner portions of each of the first mover frame 410 and the second mover frame 420. The surfaces of the magnets 600 that face coils 530 may be formed so as to correspond to the curvatures of corresponding surfaces of the coils 530.

Further, the magnets 600 may be disposed such that the surfaces thereof that face the coils 530 serve as N-poles and such that the opposite surfaces thereof serve as S-poles. However, the embodiment is not limited thereto, and the magnets 600 may be disposed in the opposite orientation.

Each of the first to fourth pressurizing portions PAP1 to PAP4 of the first mover frame 410 serves to receive the driving force from a respective one of the first to fourth magnets 600-1 to 600-4. Therefore, so long as the driving force is capable of being transmitted more effectively, the number of first to fourth magnets 600-1 to 600-4, the shape of the upper portions of the first to fourth magnets 600-1 to 600-4, and the number and shape of first to fourth receiving holes 410b are not limited to those of the embodiment described above.

The second mover frame 420 may be disposed to face the first mover frame 410 in a direction parallel to the optical axis LX, with the magnets 600 interposed therebetween. The second mover frame 420 may support the magnets 600 together with the first mover frame 410. To this end, as shown in FIG. 2, the second mover frame 420 may include therein receiving holes 420a, in which the lower portions of the first to fourth magnets 600-1 to 600-4 are seated. The receiving holes 420a may be formed in the upper side of the second mover frame 420, and may have a shape that allows the lower portions of the magnets 600 to be inserted thereinto.

Figure 9:
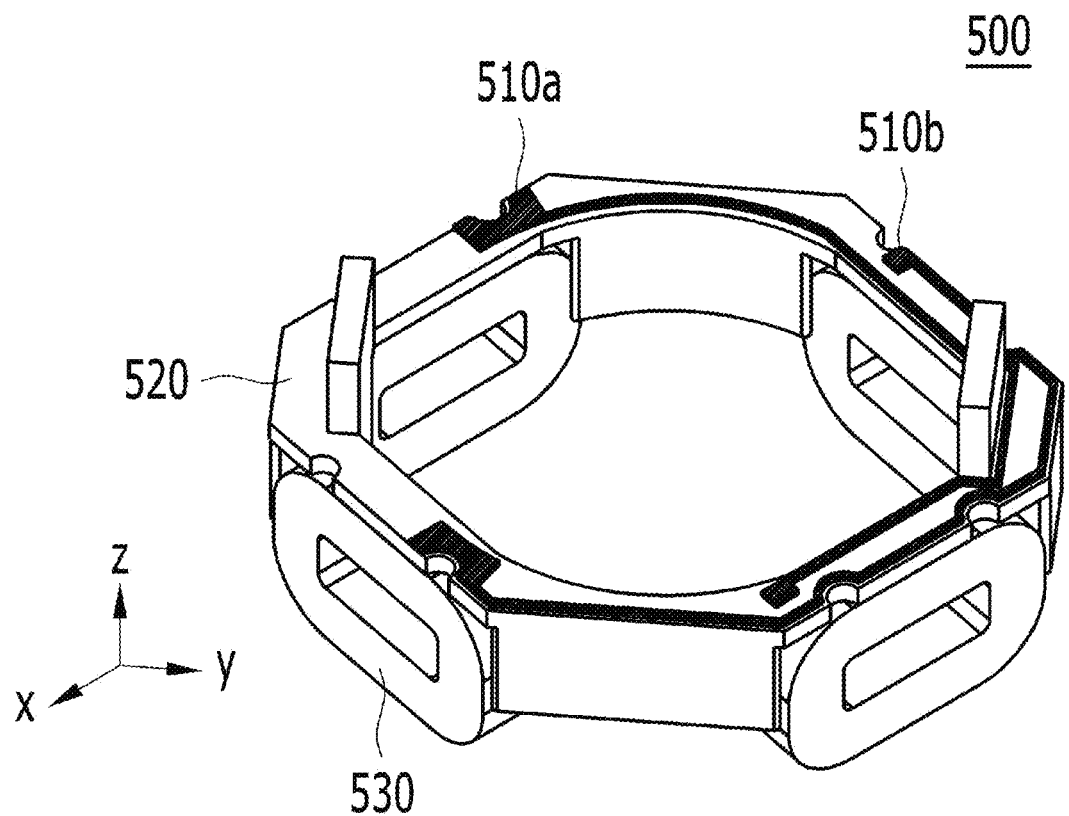
FIG. 9 illustrates an assembled perspective view of the coil unit.
Figure 10:
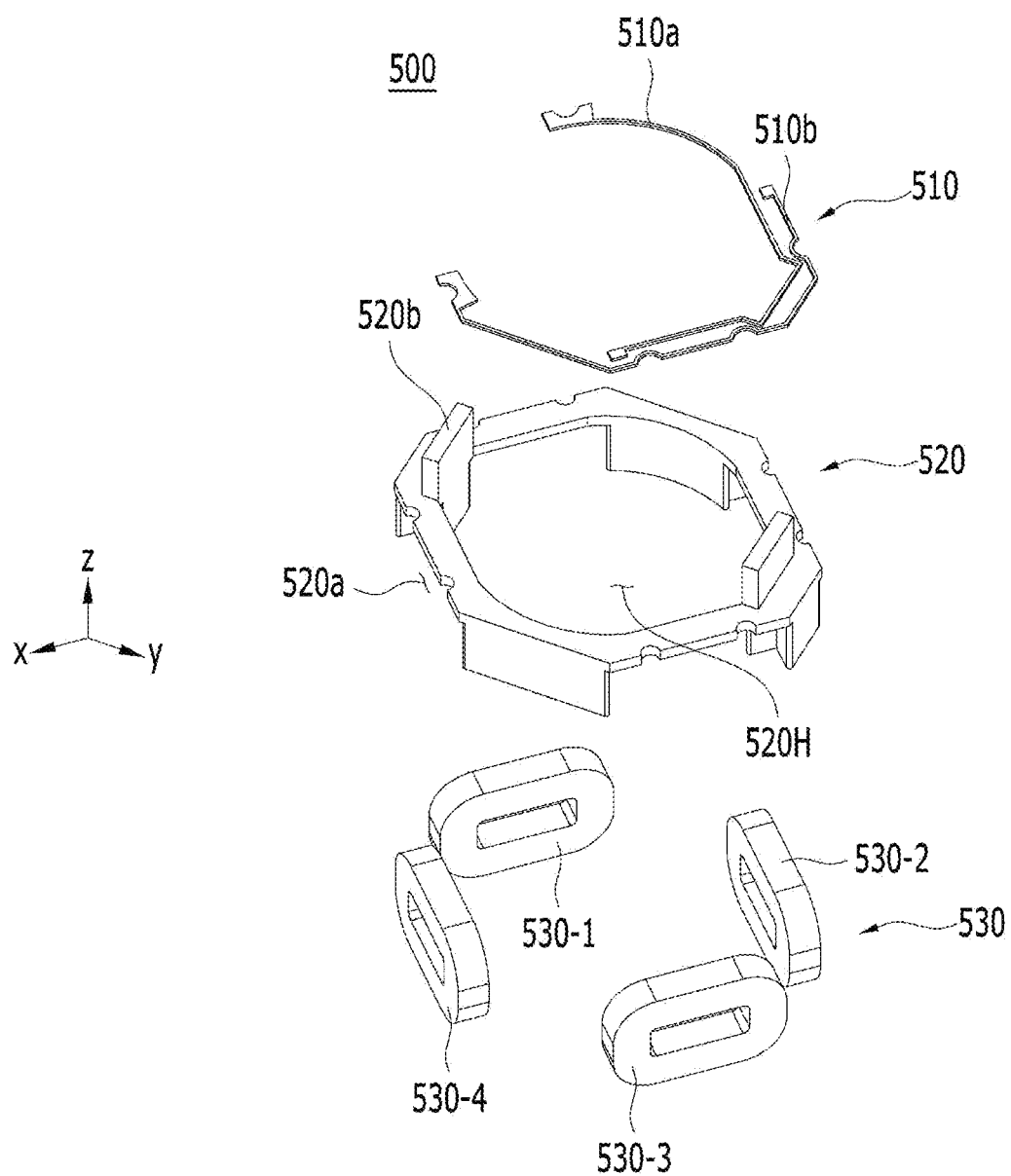
FIG. 10 illustrates an exploded perspective view of the coil unit.

FIG. 9 illustrates an assembled perspective view of the coil unit 500, and FIG. 10 illustrates an exploded perspective view of the coil unit 500.

The coil unit 500 may include a coil terminal 510, a coil holder 520, and coils 530.

The coil holder 520 serves to hold the coils 530. To this end, the coil holder 520 may include therein coil-receiving holes 520a that receive and hold the coils 530. The coil-receiving holes 520a may be formed in the lower side of the coil holder 520, and may be disposed to face the magnets 600-1 to 600-4.

Further, the coil holder 520 may be fixed by the spacer 300. For example, as shown in FIGS. 5 and 8, the spacer 300 may include a plurality of receiving holes 300b formed in the lower side thereof so as to be opposite each other. As shown in FIG. 10, the coil holder 520 may include a plurality of protrusions 520b protruding from the inner circumferential surface thereof toward the receiving holes 300b in the spacer 300 in a direction parallel to the optical axis LX. The protrusions 520b of the coil holder 520 are inserted into the receiving holes 300b, whereby the coil holder 520 may be coupled to the spacer 300.

The coil holder 520 may also include therein a hollow portion 520H. The hollow portion 520H may form a path through which light travels together with the hollow portions 240H, 300H and 410H.

The coil terminal 510 is disposed on the upper side (the top surface) of the coil holder 520, and forms a path through which current is supplied to the coils 530.

The coils 530 may be disposed to face the magnets 600, and may be inserted into and held in the receiving holes 520a. As described above, when the magnets 600 include the first to fourth magnets 600-1 to 600-4, the coils 530 may include first to fourth coils 530-1 to 530-4.

According to the embodiment, the coils 530-1 to 530-4 may be implemented as ring-shaped or angular coil blocks that are inserted into and held in the coil-receiving holes 520a in the coil holder 520. However, the embodiment is not limited thereto.

Although not shown, at least one fixed lens unit (not shown) may be disposed in the space formed by the first to fourth coils 530-1 to 530-4. That is, the fixed lens unit may be disposed in the hollow portion 520H in the coil holder 520. In this case, the coils 530 inserted into the receiving holes 520a in the coil holder 520 have a shape that surrounds the fixed lens unit. The coils 530 may be disposed between the magnets 600 and the fixed lens in a direction perpendicular to the optical axis LX.

The base 900 is disposed under the second mover frame 420, and serves to support the lens 200, the spacer 300, the first mover frame 410, the second mover frame 420, the coil unit 500, the magnets 600, and the lower elastic member 800.

Referring to FIG. 5, the base 900 may further include a stepped portion 900a. The bottom surface of the cover 100 may be disposed on the stepped portion 900a, and thus the cover 100 may be guided by the stepped portion 900a so as to be coupled thereon. The end portion of the cover 100 may be in surface contact with the stepped portion 900a. The stepped portion 900a and the end portion of the cover 100 may be bonded to each other, and may be sealed using an adhesive or the like. Therefore, the internal components 200 to 800 may be protected from the outside by the cover 100 and the base 900.

The base 900 may also include therein a hollow portion 900H. The hollow portion 900H may form a path through which light travels together with the hollow portions 240H, 300H, 410H and 520H. In addition, the aforementioned fixed lens unit may be disposed in the hollow portion 520H.

Further, the lower elastic member 800 may be disposed between the second mover frame 420 and the base 900.

Figure 11:
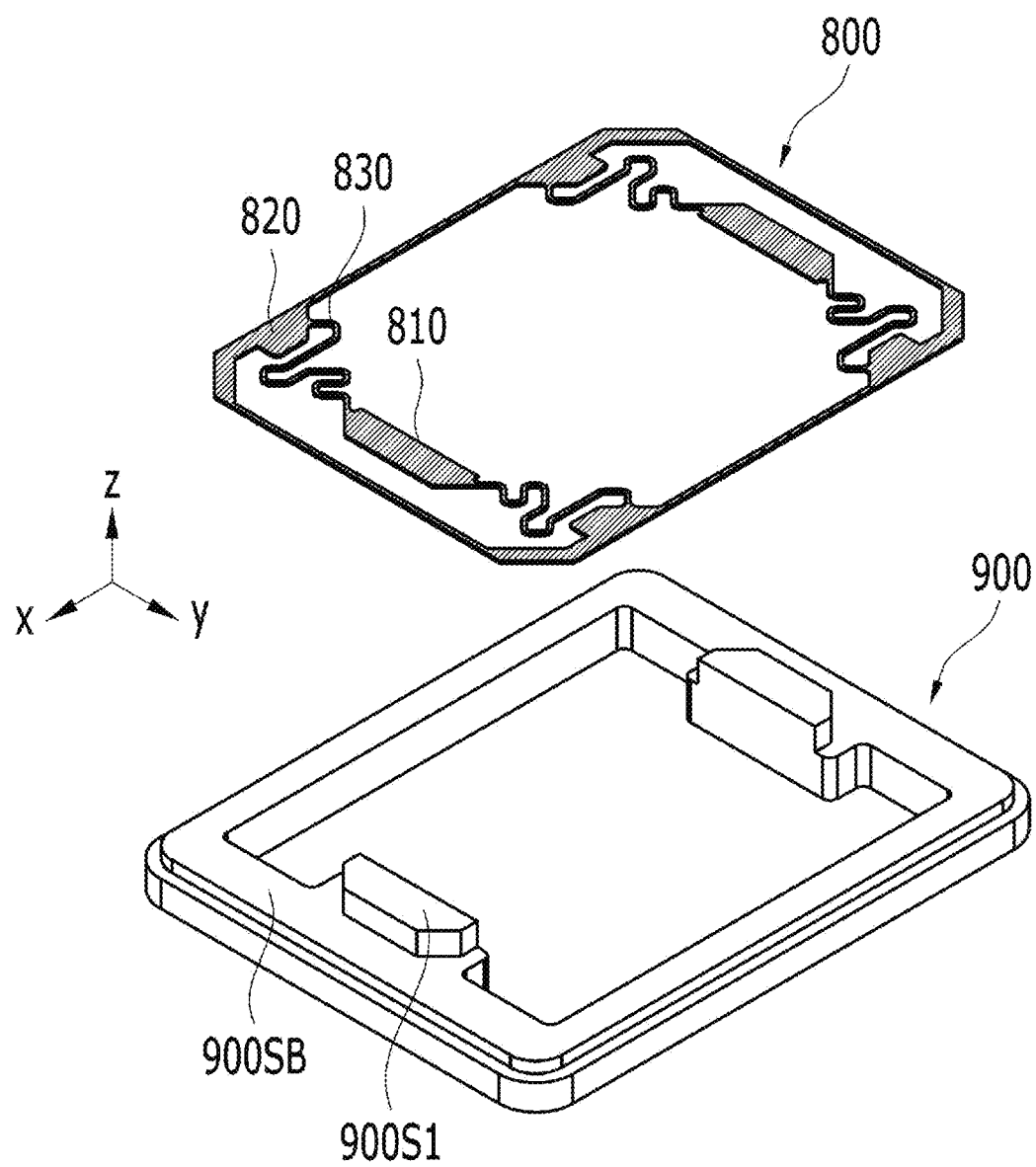
FIG. 11 illustrates a top exploded perspective view of a lower elastic member and a base according to the embodiment.
Figure 12:
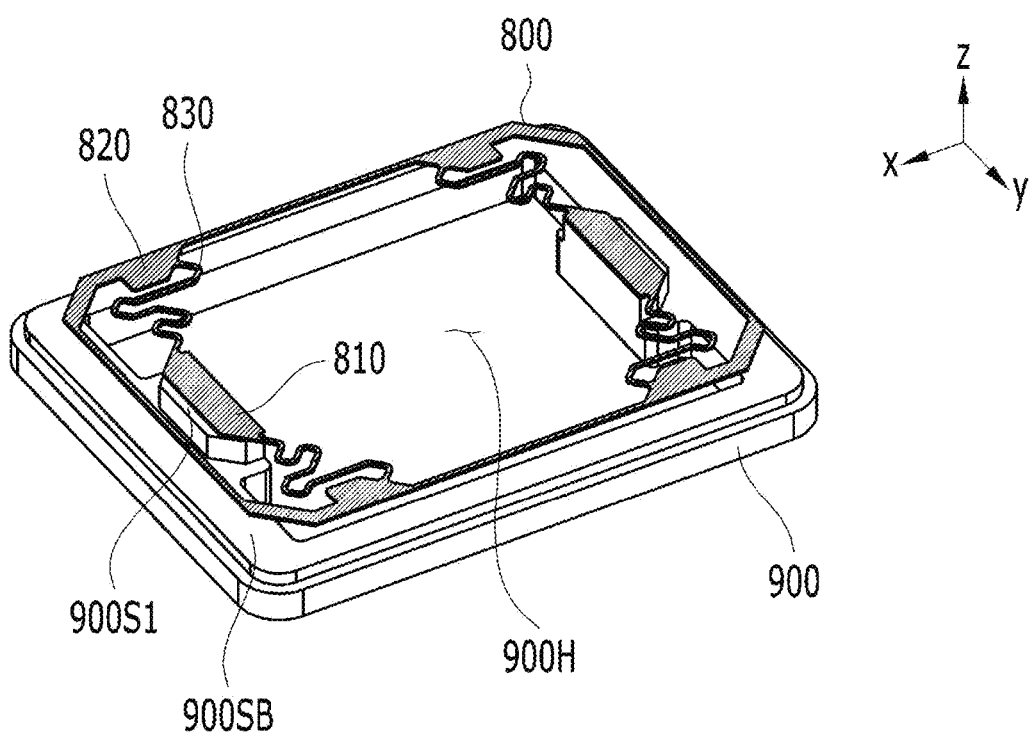
FIG. 12 illustrates a top assembled perspective view of the lower elastic member and the base according to the embodiment.

FIG. 11 illustrates a top exploded perspective view of the lower elastic member 800 and the base 900 according to the embodiment, and FIG. 12 illustrates a top assembled perspective view of the lower elastic member 800 and the base 900.

The lower elastic member 800 may include an inner frame 810, an outer frame 820, and a frame connection portion 830.

The inner frame 810 may be disposed so as to be in contact with a protruding surface 900S1 of the base 900. The protruding surface 900S1 of the base 900 may be located at a higher position than a body surface 900SB of the base 900.

The outer frame 820 may be disposed so as to be in contact with the bottom surface 420S of the second mover frame 420. To this end, the portion of the bottom surface 420S of the second mover frame 420 shown in FIG. 2 that is in contact with the outer frame 820 is spaced apart from the body surface 900SB of the base 900.

The frame connection portion 830 may connect the inner frame 810 and the outer frame 820 to each other. The frame connection portion 830 may have at least one bent portion, and may be formed in a predetermined pattern.

In the lower elastic member 800 having the configuration described above, the inner frame 810 is pressed by the protruding surface 900S1 of the base 900 in the +z-axis direction, and the outer frame 820 is pressed by the bottom surface 420S of the second mover frame 420 in the −z-axis direction. The planar area and shape of the inner frame 810 may be set such that the force by which the lower elastic member 800 is pressed in the +z-axis direction and the force by which the lower elastic member 800 is pressed in the −z-axis direction are balanced. This is because, when the members 410, 420 and 600 perform up/down movement, i.e. ascend and/or descend, in a direction parallel to the optical axis LX, which will be described later, the configuration in which the forces are balanced may help the members 410, 420 and 600 return to the original positions thereof due to the elasticity of the lower elastic member 800.

The upward and/or downward movement of the magnets 600, the first mover frame 410 and the second mover frame 420 in a direction parallel to the optical axis may be resiliently supported through a change in the position of the frame connection portion 830 and fine deformation thereof.

Each of the upper elastic member (not shown) and the lower elastic member 800 described above may be implemented as a leaf spring, but the embodiment is not limited as to the material of the upper elastic member and the lower elastic member 800.

The driving controller serves to supply current to the coils 530. To this end, the driving controller may include first and second printed circuit boards 710 and 712.

The first and second printed circuit boards 710 and 712 serve to supply current to the coils 530, and may be disposed opposite each other in a direction perpendicular to the optical axis LX (e.g. in the y-axis direction).

The first and second printed circuit boards 710 and 712 may be coupled to the side portion of the cover 100 above the base 900.

Figure 13:
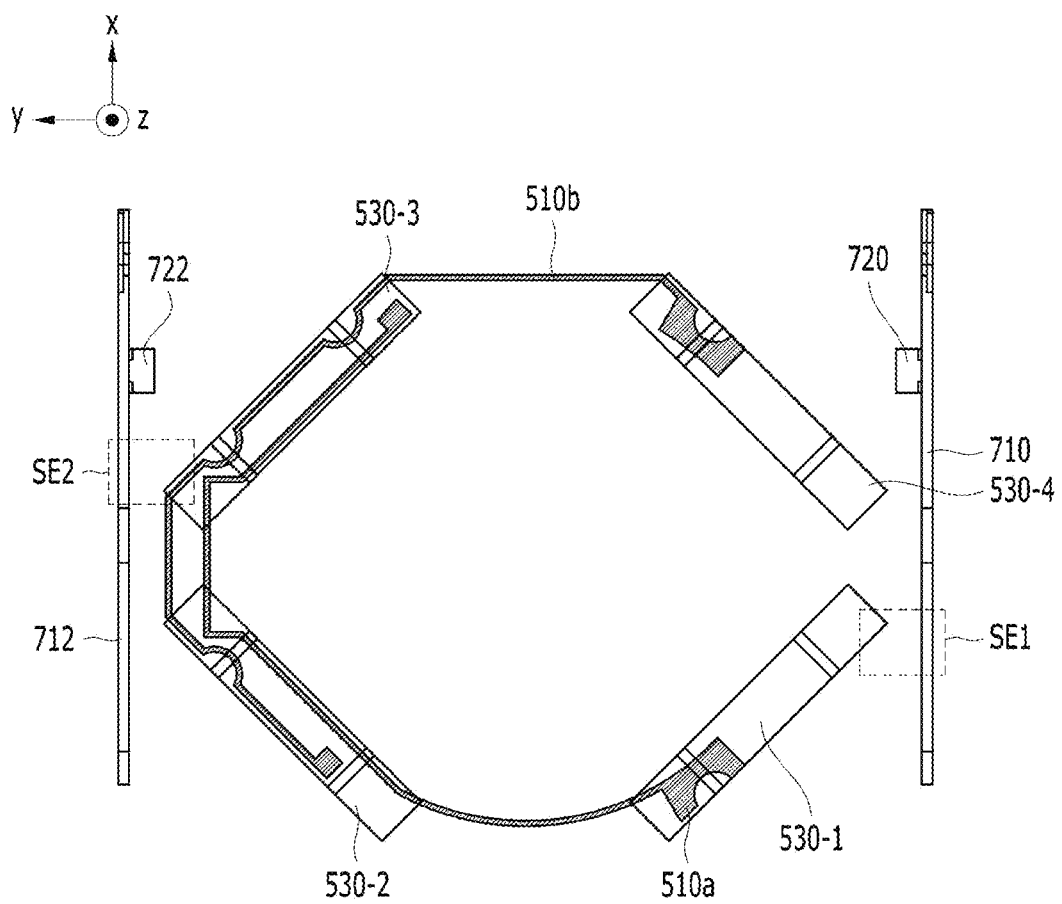
FIG. 13 illustrates a plan view of a coil terminal, a coil, first and second printed circuit boards, and first and second detection sensors.

FIG. 13 illustrates a plan view of the coil terminal 510, the coils 530-1 to 530-4, the first and second printed circuit boards 710 and 712, and the first and second detection sensors 720 and 722. An illustration of the coil holder 520 is omitted from FIG. 13 for better understanding.

The coil terminal 510 may include first and second coil terminals 510a and 510b, which are electrically separated from each other. The first coil terminal 510a may serve to electrically connect the first coil 530-1 and the third coil 530-3 to each other. The second coil terminal 510b may serve to electrically connect the second coil 530-2 and the fourth coil 530-4 to each other.

Further, an end part of one of the first coil 530-1 and the third coil 530-3 will be referred to as a first starting part, and an end part of the other one of the first coil 530-1 and the third coil 530-3 will be referred to as a first ending part. Further, an end part of one of the second coil 530-2 and the fourth coil 530-4 will be referred to as a second starting part, and an end part of the other one of the second coil 530-2 and the fourth coil 530-4 will be referred to as a second ending part.

According to an embodiment, the first or second starting part may be electrically connected to the second printed circuit board 712 in a second region SE2, and the first or second ending part may be electrically connected to the first printed circuit board 710 in a first region SE1. Alternatively, according to another embodiment, the first or second starting part may be electrically connected to the first printed circuit board 710 in the first region SE1, and the first or second ending part may be electrically connected to the second printed circuit board 712 in the second region SE2.

In this case, the connection of the first and second starting parts and the first and second ending parts to the printed circuit boards 710 and 712 corresponding thereto may be an electrically conductive connection such as soldering.

The lens module 1000 according to the embodiment may sense a position to which the magnet 600 moves in the z-axis direction, which is the optical-axis (LX) direction, or may sense positions to which the magnet 600 moves in the x-axis direction and the y-axis direction, which are perpendicular to the optical axis. To this end, the driving controller may further include first and second detection sensors 720 and 722. For example, in the case where the lens module 1000 is designed to sense a position to which the magnet 600 moves in the z-axis direction, which is the optical-axis (LX) direction, the driving controller may include either the first detection sensor 720 or the second detection sensor 722. Alternatively, in the case where the lens module 1000 is designed to sense positions to which the magnet 600 moves in the x-axis direction and the y-axis direction, which are perpendicular to the optical axis LX, the driving controller may include both the first detection sensor 720 and the second detection sensor 722.

The driving controller may feed the positions sensed by the first and second detection sensors 720 and 722 back to the outside through the first and second printed circuit boards 710 and 712. As such, when the sensed positions are fed back, driving force may be applied to the fluid LQ with a desired level of accuracy by adjusting the speed at which the magnet 600 ascends or descends. For example, as the magnitude of current applied to the coil 530 increases, the electromagnetic force may increase. As the electromagnetic force increases, the speed at which the magnet 600 ascends may increase. As the speed increases, the driving force may increase.

The first detection sensor 720 may be disposed on and supported by the inner surface of the first printed circuit board 710, and the second detection sensor 722 may be disposed on and supported by the inner surface of the second printed circuit board 712. To this end, a seating groove (not shown) in which the first detection sensor 720 is to be disposed may be formed in the inner surface of the first printed circuit board 710, and a seating groove (not shown) in which the second detection sensor 722 is to be disposed may be formed in the inner surface of the second printed circuit board 712. However, the embodiment is not limited thereto. Alternatively, the first and second detection sensors 720 and 722 may be attached to and supported by the first and second printed circuit boards 710 and 712 using an adhesive member such as an epoxy or a piece of double-sided tape.

The embodiment is not limited as to the specific method in which the first and second detection sensors 720 and 722 are disposed (or mounted) on the first and second printed circuit boards 710 and 712.

According to an embodiment, the first or second detection sensor 720 or 722 may sense an extent (or a position) to which the magnet 600 moves in the optical-axis (LX) direction or in a direction parallel to the optical axis LX (e.g. in the z-axis direction).

According to another embodiment, the first detection sensor 720 may sense an extent (or a position) to which the magnet 600 moves in a direction perpendicular to the optical axis LX (e.g. in the x-axis direction) (or in the y-axis direction), and the second detection sensor 722 may sense an extent (or a position) to which the magnet 600 moves in a direction perpendicular to the optical axis LX (e.g. in the y-axis direction) (or in the x-axis direction).

Each of the first and second detection sensors 720 and 722 may have a plurality of pins. For example, referring to FIG. 2, the second detection sensor 722 may include first and second pins PN1 and PN2. The first pin PN1 may include 1-$1^{st}$ and 1-$2^{nd}$ pins PN11 and PN12, which are respectively connected to a driving voltage and to a ground, and the second pin PN2 may include 2-$1^{st}$ and 2-$2^{nd}$ pins PN21 and PN22, which output the sensed results. Here, the sensed results output through the 2-$1^{st}$ and 2-$2^{nd}$ pins PN21 and PN22 may be of a current type, but the embodiment is not limited as to the type of a signal. Of course, similar to the second detection sensor 722, the first detection sensor 720 may include 1-$1^{st}$, 1-$2^{nd}$, 2-$1^{st}$ and 2-$2^{nd}$ pins PN11, PN12, PN21 and PN22.

According to the embodiment, the driving power may be supplied from the first printed circuit board 710 to the 1-$1^{st}$ and 1-$2^{nd}$ pins PN11 and PN12 of the first detection sensor 720, and the sensed results may be output from the 2-$1^{st}$ and 2-$2^{nd}$ pins PN21 and PN22 of the first detection sensor 720 to the first printed circuit board 710.

Each of the first and second detection sensors 720 and 722 may be disposed in the same line as the magnet 600. Accordingly, the center of the magnet 600 and the center of each of the first and second detection sensors 720 and 722 may be aligned with each other. For example, the center of the first detection sensor 720 and the center of the fourth magnet 600-4 may be aligned with each other, and the center of the second detection sensor 722 and the center of the third magnet 600-3 may be aligned with each other.

Each of the first and second detection sensors 720 and 722 may be implemented as a detection sensor, but may also be implemented as any of various sensors, so long as it is capable of sensing a change in magnetic force.

The first printed circuit board 710 may include a first terminal unit 730, and the second printed circuit board 712 may include a second terminal unit 740.

According to the embodiment, each of the first and second terminal units 730 and 740 may include a plurality of terminals. For example, referring to FIG. 1, the second terminal unit 740 may include first to sixth terminals TM1 to TM6.

The first terminal unit 730 may include four terminals that are electrically connected to the first detection sensor 720 and two terminals that are electrically connected to two selected from among the first and second starting parts and the first and second ending parts. The second terminal unit 740 may include four terminals that are electrically connected to the second detection sensor 722 and two terminals that are electrically connected to the remaining two of the first and second starting parts and the first and second ending parts.

The external power applied through some of the plurality of terminals TM1 to TM6 mounted in each of the first and second terminal units 730 and 740 may be supplied to a corresponding one of the first to fourth coils 530-1 to 530-4, and may be supplied to a corresponding one of the first and second detection sensors 720 and 722. In addition, the feedback signals, which correspond to the results sensed by the first and second detection sensors 720 and 722 and are necessary in order to control the position of the magnet 600, may be output to the outside through the remaining ones of the plurality of terminals TM1 to TM6.

The number of terminals included in each of the terminal units 730 and 740 may be increased or decreased depending on the types of components that need to be controlled.

According to the embodiment, each of the first and second printed circuit boards 710 and 712 may be implemented as an FPCB, without being limited thereto, and the terminals of the first and second printed circuit boards 710 and 712 may be directly formed on the surface of the base 900 using a surface electrode method or the like.

According to an embodiment, the magnet 600 serves as a magnet of each of the first and second detection sensors 720 and 722. However, according to another embodiment, a separate magnet (not shown) for a sensor may be disposed to face each of the first and second detection sensors 720 and 722.

The cover 100 may be substantially formed in a box shape, and may surround the lens 200, the spacer 300, the first mover frame 410, the second mover frame 420, the coil unit 500, the magnet 600, and the lower elastic member 800 together with the first and second printed circuit boards 710 and 712. The cover 100 may include therein first and second openings OP1 and OP2, which are disposed opposite each other. The first and second printed circuit boards 710 and 712 may be respectively disposed in the first and second openings OP1 and OP2.

When current is supplied to one of the coils 530 through a corresponding terminal of the first and second terminal units 730 and 740 of the first and second printed circuit boards 710 and 712, electromagnetic force may be generated by interaction between the magnet 600 and the coil 530. At this time, the members 410, 420 and 600 may ascend or descend, i.e. may perform up/down movement, due to the generated electromagnetic force. In addition, when the members 410, 420 and 600 move, the driving force may be applied to a corresponding one of the pressurized regions P1 to P4 of the fluid LQ through the pressurizing portions PAP1 to PAP4 of the first mover frame 410. Therefore, pressure may be applied to the corresponding one of the pressurized regions P1 to P4 of the fluid LQ, and thus the lens surface 220S may be tilted so as to be positioned in the first or second tilted plane H2 or H3, whereby the OIS function may be performed.

In addition, when the OIS function is performed through the up/down movement of the members 410, 600 and 420, the members 410, 600 and 420 may be resiliently supported by the elastic force of the movable membrane 220 (or the elastic force of the upper elastic member) and the elastic force of the lower elastic member 800, and may thus be returned to the original positions thereof.

Hereinafter, a lens module according to a comparative example and the lens module according to the embodiment will be compared and described.

In the lens module according to the comparative example, pressure is applied to a pressurized region of a fluid LQ using a voice-coil-motor (VCM)-type pressurizing frame. Therefore, the lens module according to the comparative example requires therein a separate space to mount the VCM-type pressurizing frame therein.

Conversely, in the lens module according to the embodiment, the coil 530 is disposed around the fixed lens unit, and thus a separate space for accommodating a VCM-type pressurizing frame therein is not required, unlike the comparative example. Therefore, compared to the comparative example, the lens module 1000 according to the embodiment may have a less complicated configuration, thereby reducing the manufacturing costs thereof, simplifying the manufacturing process thereof, and reducing the overall size thereof.

Hereinafter, a method of manufacturing the lens module 1000 described above will be described with reference to the accompanying drawings.

First, referring to FIG. 8, the magnet 600 is seated in the receiving hole 410b in the first mover frame 410.

Subsequently, the lens 200 is coupled to the assembly of the first mover frame 410 and the magnet 600.

Subsequently, the spacer 300 is coupled to the lower portion of the lens 200.

Subsequently, the coil 530 is inserted into the receiving hole 520a in the coil holder 520, and the coil terminal 510 is disposed on the top surface of the coil holder 520.

Subsequently, the second mover frame 420 is mounted to the lower portion of the magnet 600.

Subsequently, the first mover frame 410, the coil unit 500, the magnet 600, and the second mover frame 420 are covered by the cover 100.

Subsequently, the first and second printed circuit boards 710 and 712 are respectively fitted into the first and second openings OP1 and OP2, formed in the cover 100 so as to be opposite each other.

Subsequently, the starting part or the ending part of a corresponding coil is soldered to the first printed circuit board 710 in the first region SE1 through a third opening OP3 formed in the first printed circuit board 710, and the starting part or the ending part of a corresponding coil is soldered to the second printed circuit board 712 in the second region SE2 through a fourth opening OP4 formed in the second printed circuit board 712.

Subsequently, the lower elastic member 800 is coupled to the base 900.

Subsequently, the assembly of the base 900 and the lower elastic member 800 is combined with the assembly of the cover 100 and the first and second printed circuit boards 710 and 712, thereby completing the manufacture of the lens module 1000.

Hereinafter, an embodiment of a camera module 2000 including the lens module 1000 according to the above-described embodiment will be described with reference to the accompanying drawings.

Figure 14:
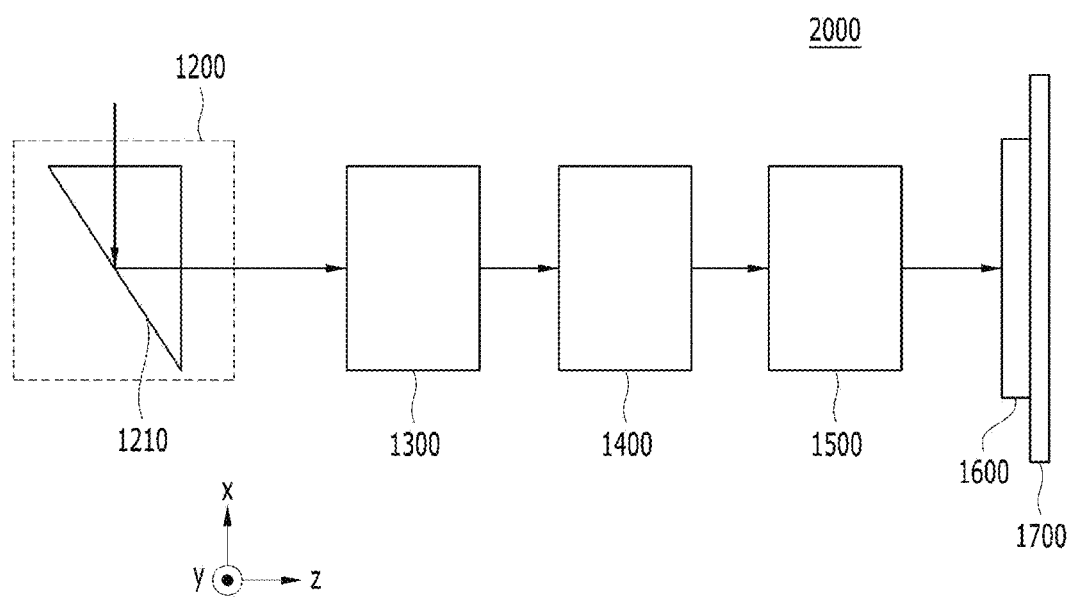
FIG. 14 illustrates a conceptual diagram of a camera module according to an embodiment.

FIG. 14 illustrates a conceptual diagram of a camera module 2000 according to an embodiment.

The camera module 2000 shown in FIG. 14 may include an optical path converter 1200, a plurality of lens units 1300 to 1500, an image sensor 1600, and a main board 1700.

The optical path converter 1200 may convert the optical path such that the light incident thereon in the −x-axis direction travels in the optical-axis direction (or in a direction parallel to the optical axis) (e.g. in the z-axis direction) toward the plurality of lens units 1300 to 1500. Due to this optical path converter 1200, the length of the optical travel path to the image sensor 1600 is extended, thereby enabling the zoom-in/zoom-out function. To this end, the optical path converter 1200 may include a prism 1210 that converts the optical path such that the light incident thereon in the −x-axis direction travels in the z-axis direction, but the embodiment is not limited thereto. In some cases, the optical path converter 1200 may be omitted.

At least one of the first to third lens units 1300 to 1500, aligned in the optical-axis (LX) direction (or in a direction parallel to the optical axis LX), may include the lens module 1000 described above, and the remaining ones thereof may include fixed lens units.

According to an embodiment, only one of the first to third lens units 1300 to 1500 may include the lens module 1000 described above, and the remaining two lens units may each include a fixed lens unit. For example, the first lens unit 1300 may include the above-described lens module 1000 having the lens 200, and each of the second and third lens units 1400 and 1500 may include a fixed lens unit. The second lens unit 1400 may include the above-described lens module 1000 having the lens 200, and each of the first and third lens units 1300 and 1500 may include a fixed lens unit. The third lens unit 1500 may include the above-described lens module 1000 having the lens 200, and each of the first and second lens units 1300 and 1400 may include a fixed lens unit.

According to another embodiment, unlike the configuration shown in FIG. 14, only two lens units may be disposed between the optical path converter 1200 and the image sensor 1600, or four or more lens units may be disposed therebetween. When four lens units are disposed, two of the four lens units may each include the above-described lens module 1000, and the remaining two lens units may each include a fixed lens unit.

When the camera module 2000 includes a plurality of lens units, the embodiment is not limited as to the specific position at which the lens module 1000 described above is disposed. For example, the lens module 1000 described above may be disposed between the fixed lens units.

Among the first to third lens units 1300 to 1500 shown in FIG. 14, the lens unit including the fixed lens unit may include a separate cover can (not shown).

In addition, the lens unit including the lens module 1000 described above with reference to FIG. 14 may perform an OIS function, and the remaining lens unit may perform an AF function. Here, the 'auto-focusing (AF) function' is a function of automatically focusing an image of an object on the surface of an image sensor.

The image sensor 1600 is disposed on the main board 1700. The image sensor 1600 may perform a function of converting the light that has passed through the plurality of lens units 1300 to 1500 into image data. More specifically, the image sensor 1600 may convert the light into analog signals through a pixel array including a plurality of pixels, and may synthesize digital signals corresponding to the analog signals to generate image data.

The main board 1700 may be disposed under the image sensor 1600. Further, the main board 1700 may be electrically connected to the first and second terminal units 730 and 740 of the above-described first and second printed circuit boards 710 and 712 through soldering or the like.

Although only a limited number of embodiments have been described above, various other embodiments are possible. The technical contents of the above-described embodiments may be combined into various forms as long as they are not incompatible with one another, and thus may be implemented in new embodiments.

An optical device may be implemented using the camera module 2000 including the lens module 1000 according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 2000, a display unit (not shown) configured to output an image, a battery (not shown) configured to supply power to the camera module 2000, and a body housing in which the camera module 2000, the display unit, and the battery are mounted. The optical device may further include a communication module, which may communicate with other devices, and a memory unit, which may store data. The communication module and the memory unit may also be mounted in the body housing.

While the present disclosure has been particularly shown and described with reference to exemplary embodiments thereof, these embodiments are only proposed for illustrative purposes and do not restrict the present disclosure, and it will be apparent to those skilled in the art that various changes in form and details may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

MODE FOR INVENTION

Various embodiments have been described in the best mode for carrying out the disclosure.

INDUSTRIAL APPLICABILITY

A lens module and a camera module including the same according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A lens module, comprising:
a lens comprising a fluid and a cavity to accommodate the fluid;
a first mover frame supporting the lens, the first mover frame comprising a pressurizing portion disposed to face a pressurized region of the fluid;
a magnet disposed at the first mover frame;
a coil unit comprising coils disposed to face the magnet in a first direction perpendicular to an optical axis;
a second mover frame disposed to face the first mover frame in a second direction in parallel to the optical axis, with the magnet interposed therebetween, the second mover frame supporting the magnet together with the first mover frame; and
a driving controller configured to control supply of current to the coils such that the pressurized region of the fluid is pressurized by the pressurizing portion of the first mover frame through an interaction between the coils and the magnet,
wherein the lens comprises:
a receiving body including the cavity to accommodate the fluid;
a movable membrane disposed to store the fluid together with the receiving body; and
a pressurizing frame disposed between the movable membrane and the first mover frame, the pressurizing frame being configured to apply a driving force from the first mover frame to the pressurized region of the fluid, and
wherein the pressurizing frame comprises:
a driving frame disposed under the movable membrane, the driving frame having therein a hollow portion; and
a protrusion protruding outwards from a lower portion of the driving frame, the protrusion being disposed between the pressurizing portion of the first mover frame and the pressurized region in the second direction.

2. The lens module according to claim 1, wherein the coil unit comprises:
a coil holder holding the coils; and
a coil terminal disposed on the coil holder to form a path through which the current is supplied to the coils.

3. The lens module according to claim 2, comprising a spacer by which the coil holder is fixed.

4. The lens module according to claim 3, wherein the spacer includes a plurality of receiving holes formed in a lower side thereof so as to be opposite to each other, and
wherein the coil holder includes a plurality of protrusions protruding from an inner circumferential surface thereof toward the receiving holes in the spacer in the second direction.

5. The lens module according to claim 1, comprising:
a base disposed under the second mover frame.

6. The lens module according to claim 5, comprising:
a lower elastic member disposed between the second mover frame and the base.

7. The lens module according to claim 6, wherein the driving controller comprises:
first and second printed circuit boards configured to supply the current to the coils, the first and second printed circuit boards being disposed opposite each other.

8. The lens module according to claim 7, wherein the driving controller comprises:
a first detection sensor disposed on an inner surface of the first printed circuit board; and
a second detection sensor disposed on an inner surface of the second printed circuit board.

9. The lens module according to claim 8, wherein the first printed circuit board comprises:
a first terminal unit electrically connected to the first detection sensor and to a first coil of the coils, and
wherein the second printed circuit board comprises:
a second terminal unit electrically connected to the second detection sensor and to a second coil of the coils.

10. The lens module according to claim 8, wherein a center of the magnet and a center of each of the first and second detection sensors are aligned with one another.

11. The lens module according to claim 6, wherein the lower elastic member comprises:
an inner frame disposed so as to be in contact with a protruding surface of the base;
an outer frame disposed so as to be in contact with a bottom surface of the second mover frame; and a frame connection portion connecting the inner frame and the outer frame to each other.

12. A camera module, comprising:
a main board;
an image sensor disposed on the main board; and
at least one lens unit disposed so as to be aligned with the image sensor in an optical-axis direction,
wherein the at least one lens unit comprises the lens module according to claim 1.

13. The lens module according to claim 1, wherein the pressurized region of the fluid is located at an edge of the fluid, and
wherein the pressurized region includes first to fourth pressurized regions spaced apart from each other at regular intervals with respect to the optical axis.

14. The lens module according to claim 1, wherein the magnet is disposed under the first mover frame so as to face the pressurizing portion.

15. The lens module according to claim 1, wherein the magnet comprises a plurality of magnet units and the pressurizing portion comprises a plurality of pressurizing sub-portions, a number of the plurality of magnet units being same as a number of the plurality of pressurizing sub-portions.

16. The lens module according to claim 1, wherein the first mover frame includes therein a receiving hole in which an upper portion of the magnet is seated.

17. The lens module according to claim 16, wherein the receiving hole is formed in the first mover frame so as to be positioned under the pressurizing portion, and has a shape that allows the upper portion of the magnet to be inserted thereinto.

18. The lens module according to claim 1, wherein the protrusion is seated in and supported by a receiving hole of the first mover frame.

* * * * *